United States Patent Office 3,472,619
Patented Oct. 14, 1969

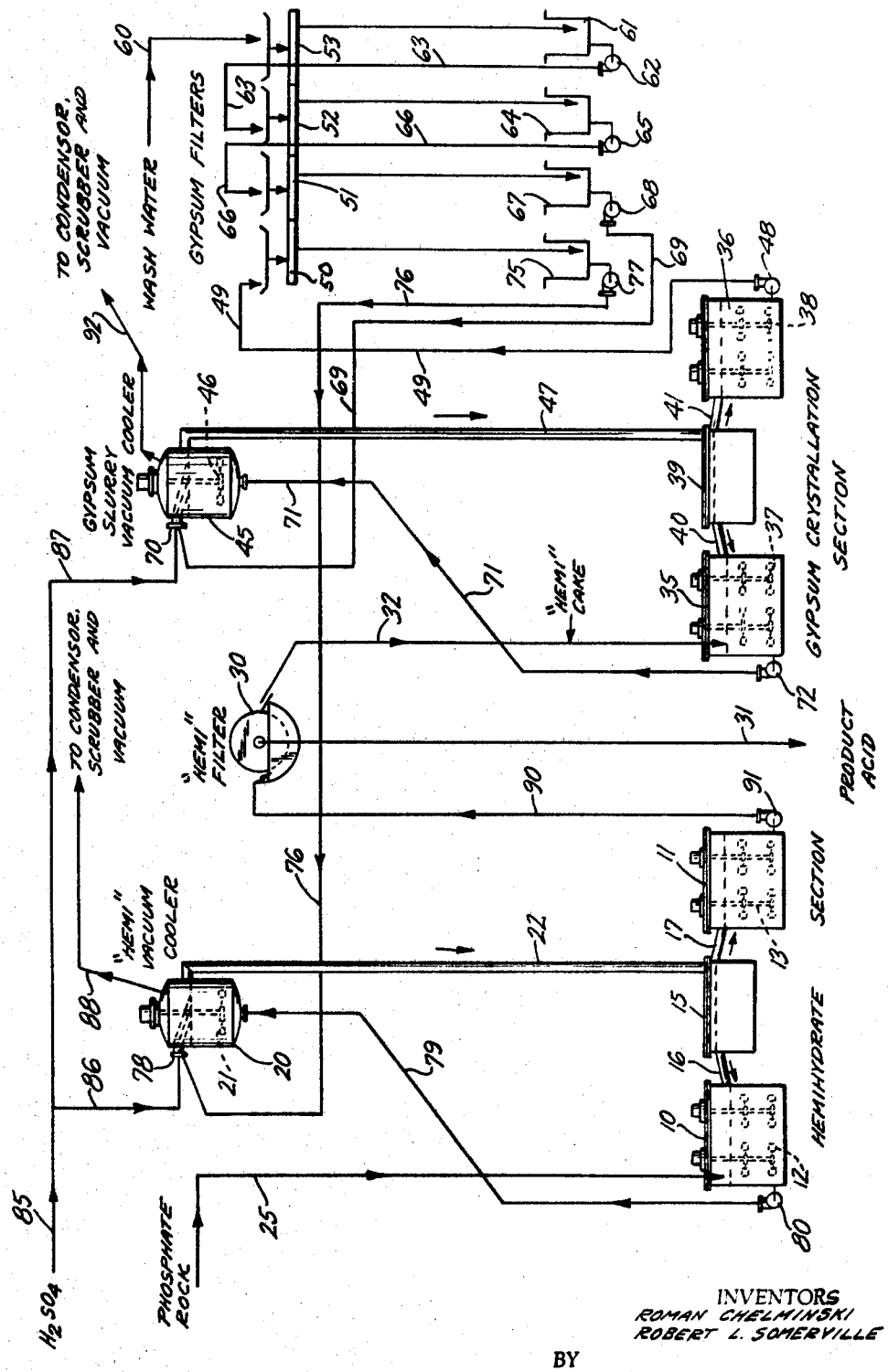

3,472,619
PRODUCTION OF PHOSPHORIC ACID AND
CALCIUM SULFATE
Roman Chelminski, Wilton, Conn., and Robert L. Somerville, Neshanic, N.J., assignors to Singmaster & Breyer, New York, N.Y., a co-partnership
Continuation of application Ser. No. 349,972, Mar. 6, 1964. This application Feb. 26, 1968, Ser. No. 708,420
Int. Cl. C01f *11/46;* C01b *25/22*
U.S. Cl. 23—122                                    6 Claims

ABSTRACT OF THE DISCLOSURE

A continuous two-stage wet process is provided for the production of phosphoric acid and gypsum product by acidulation of phosphate rock wherein the most appropriate operating parameters for each product are deliberately maintained in separate stages, with the first stage producing a strong phosphoric acid product under controlled conditions also producing deliberately a stable hemihydrate precipitate, after which the strong phosphoric acid is withdrawn, followed by a second stage re-digestion and recrystallization of the precipitate from the first stage in the presence of weak phosphoric acid and a quantity of sulphuric acid in an amount necessary to produce free $SO_4$ ions to precipitate the second gypsum product and weak phosphoric acid, with recirculation of the filtrate from the second stage back through both stages of the process.

---

This application is a continuation of co-pending application S.N. 349,972, filed Mar. 6, 1964.

This invention relates to the production of phosphoric acid by acidulation of phosphate rock (i.e., reaction of calcium phosphate in phosphate rock with sulphuric acid to produce calcium sulphate and phosphoric acid) and, more particularly, to methods and arrangements of apparatus for such phosphoric acid production providing enhanced recovery of available phosphate materials in the product acid at higher concentrations along with gypsum by-products of enhanced purity and crystal formation for greater ease of filtering and smaller losses of phosphate materials.

As will be understood, wet processes generally of the character to which this invention relates for producing phosphoric acid conventionally involve the digestion of phosphate rock (containing calcium phosphate plus a variety of other ingredients and impurities) with sulphuric acid to form phosphoric acid and gypsum (calcium phosphate dihydrate) as the desired resultants. Obviously, other ancillary or side reactions also occur under the conditions of conventional commercial operations, and other by-products may be formed, as well as a variety of different crystal sizes and forms of the crystalline resultants (e.g., calcium sulphate hemihydrate instead of the desired dihydrate, insoluble dicalcium or iron or aluminum phosphates instead of soluble phosphates, etc.), all depending primarily on such operating conditions as temperature, concentration of acids, slurry concentrations, speed of precipitation and cooling, etc.

For commercial reasons, it may be desired that the product phosphoric acid be initially produced at as high a concentration as possible and, optimumly, to contain as little as possible residual free sulphuric acid from the acidulation step. Similarly, economic and efficient operation is enhanced to the extent that as much as possible of the original phosphate ingredients in the starting material is incorporated in the phosphoric acid product instead of being entrapped or included in the insoluble gypsum crystalline by-product which must be removed from the soluble phosphate material of the desired product.

In this connection, it may be noted that producing a crystal form of the insoluble gypsum fraction which inhiibts the efficiency of washing the filter cake free of soluble phosphates with a minimum quantity of water may be a principal limiting factor in obtaining a phosphoric acid product of maximum concentration without separate concentrating or evaporating steps. Thus, whatever is necessarry for washing in the filtering steps diminishes the amount of water available for diluting the sulphuric acid reactant in the digesting or reaction steps if a product of maximum concentration is to be obtained. Yet the type of insoluble resultant and the particular size and crystal form thereof may be considered functions of such factors as concentration of reacting acid in the digestion steps, the temperature thereof as influenced by heat of reaction from concentrated acid and/or heat of dilution thereof, speed or drasticness of cooling of the concentrated slurry, and generally a variety of other inconsistent circumstances or operating techniques.

Stated somewhat otherwise, those operating conditions or parameters which tend to maximize the initial production of most highly concentrated phosphoric acid and most complete recovery of phosphate materials in the product may generally be considered as inconsistent or incompatible with those conditions or parameters which tend to maximize the production of the necessary gypsum by-product in the most desired and most readily filterable crystal size or form of greatest purity (or least contamination with phosphate materials which are lost as useful product to the extent that they are included in the insoluble gypsum by-product phase).

Merely as illustrative, attempting to increase final product concentration by minimizing dilution of the sulphuric acid reactant may cause excessively high local temperatures in the digestion step (from heat of reaction) and excessively high localized concentrations (as the sulphuric acid is introduced into the phosphate rock slurry) which may, in turn, promote precipitation of many excessively fine crystals of gypsum, hemihydrate and anhydrite and/or degrade previously produced high quality gypsum crystals. Also such conditions may be sufficient to coat the particles of phosphate rock with a shell of calcium sulphate sufficiently impenetrable to resist complete reaction so that a core of phosphate in the particles may leave the system along with the gypsum tailings. Dilution and cooling of sulphuric acid attempts to correct the foregoing, but it results in reducing the concentration of product acid, or in reducing the amount of water available for washing the gypsum cake, while a continuing risk is involved in that substantial proportions of the phosphate materials available may co-precipitate or co-crystallize with gypsum as dicalcium phosphate entrapped within the calcium sulphate crystal lattice, thus again incorporating uselessly in the insoluble tailings fraction phosphate materials which it is desired to include in the soluble phosphoric acid fraction.

In any event, and as well understood in this art, at virtually every stage of such a wet process acidulation technique for producing phosphoric acid the optimum conditions for maximizing concentration and efficiency of soluble phosphate production and recovery with a minimum of free sulphuric acid are to one extent or another substantially different from or inconsistent or incompatible with the optimum conditions for maximum production of desirably pure gypsum in a crystal form most readily filterable with the least amount of filter wash water and the least aggravation in the filtering and other steps arising from clogging of the filters, scaling of the apparatus and conduits and, particularly, the cooling apparatus involved.

Thus, if it is attempted to control conditions in the initial reaction or digestion stages, as by controlling dilution or temperature or precipitation or otherwise, for the purpose of producing a readily filterable final gypsum crystal product, difficulty may then be experienced in producing a phosphoric acid product of a desired degree of concentration and freedom from sulphuric acid and/or with an optimumly high recovery of total phosphate in the phosphoric acid product. Conversely, attempts to maximize the concentration and purity of the phosphoric acid product by controlling the conditions of initial or intermediate reaction stages and/or the temperatures therein may produce similar difficulties in obtaining optimum total efficiency because such controls may favor or promote the formation of a crystalline product in undesired forms or sizes (e.g., producing hemihydrate instead of dihydrate crystals and/or dihydrate crystals of small needle-shape difficult to filter and/or preliminary precipitation forming scale). Indeed, even if it is attempted to compromise the foregoing incompatible situations by deliberately producing an undesired hemihydrate crystal form for subsequent recrystallization into gypsum and separation from the phosphoric acid product, difficulties still may be found in being able with complete freedom to maximize the various incompatible conditions and/or operate a large scale plant with the desired latitude of operating condition ranges, while also obtaining phosphoric acid product concentrations as high as, perhaps, 40% and/or total phosphate yield recoveries higher than conventional processes.

According to this invention, by contrast, there are provided methods and arrangements of apparatus for the production of phosphoric acid and gypsum by acidulation of phosphate rock and under circumstances where a substantially enhanced phosphate recovery is achieved at substantially higher phosphoric acid concentrations, even from low-grade phosphate rock containing substantial proportions of iron or aluminum, and with gypsum crystal formation in a form enhancing the ease of filtration thereof. To this end, the concentration of reactants in the preliminary digestion stages, particularly sulphuric acid, is controlled and digested to promote the initial production of calcium sulphate hemihydrate, instead of gypsum, although this by-product is essentially unstable and undesired as the final crystalline phase, and then the hemihydrate so produced as an intermediate product is recrystallized into a more desirable form of gypsum, while the soluble phosphate is separated from the hemihydrate first produced and withdrawn from the process as final product prior to the subsequent recrystallization and treatment of hemihydrate into the ultimately desired crystalline phase and under conditions where such recrystallization occurs after separation and withdrawal of the soluble phosphate product acid from the system and with such steps substantially free of soluble phosphate in amounts which impose a significantly adverse environment on the desired production of the crystalline phase.

With the foregoing and additional objects in view, this invention will be described in more detail, and other objects and advantages thereof will be apparent from the following description, the accompanying drawing, and the appended claims.

In the drawing, there is shown in essentially diagrammatic or schematic flow sheet form a sequence of method steps and arrangement of apparatus embodying and for practicing this invention.

For optimum commercial or other results, it may be desired to produce phosphoric acid and gypsum specifically by techniques and apparatus and under conditions, such as are ambodied herein, where three particular conditions are simultaneously maintained, such as (a) producing the product phosphoric acid at as high a concentration as possible as withdrawn from a process and without water evaporation or other concentrating steps, (b) producing such acid product to be substantially free of residual sulphuric acid reactant, and (c) producing such product to contain substantially all of the phosphate fed into the plant as phosphate rock starting material and with as little as possible of phosphates being withdrawn from the process as included in the crystalline gypsum phase.

For accommodating condition (a) in accordance herewith, the principal acidulation or digestion steps are controlled to favor the production and precipitation of calcium sulphate hemihydrate, rather than the ultimately desired dihydrate, if a final acid concentration in the range of 40%–50% $P_2O_5$ is to be obtained, because it has been found that the dihydrate gypsum does not readily form in slurries of such high concentrations at reasonable operating temperatures (for example, above 60° C.). Maintaining such operating conditions in the acidulation digesters as will provide such high concentrations of product acid, however, may interject certain other highly objectionable difficulties. For example, the hemihydrate thus formed initially is generally not considered a satisfactory material for a final filtering step because, for example, on washing for $P_2O_5$ recovery, the hemihydrate hydrates quickly and readily to the dihydrate gypsum form, but under circumstances which cause a hardening or "setting up" action which tends to clog the filters and to scale the filtrate pipe lines, as well as because of the known difficulty of effectively and completely washing soluble phosphate out of a hydrating filter cake of calcium sulphate, as would be necessary if condition (c) were fulfilled to obtain as the soluble liquid effluent substantially all the $P_2O_5$ in the system with as little as possible leaving the system included in the solid phase.

Similarly, attempting to fulfill condition (b) and produce a liquid acid product substantially free of sulphuric acid may be considered essentially incompatible with maximizing the initial acidulation steps to produce as concentrated a phosphoric acid as possible. Thus, it has been found that gypsum dihydrate formed in an environment which does not contain an appreciable proportion of excess or free sulphuric acid presents additional difficulties from the standpoint of efficient operation. Primary among these is the tendency for a co-crystallization of dicalcium phosphate dihydrate to occur within the gypsum crystal lattice. The dicalcium phosphate crystals have a similar geometry to gypsum crystal lattice, thus introducing a further and substantial phosphate loss. To prevent such losses of $P_2O_5$ in the solid phase, the actual formation of final gypsum crystals in accordance herewith preferably occurs under circumstances where there is a substantial excess (e.g., 5% or more) of sulphuric acid and, consequently, under conditions which are inconsistent in the initial stages with producing a phosphoric acid product free of sulphuric acid.

Also, as further aiding the achieving of condition (c) where substantially all of the available phosphate is withdrawn from the system as a part of the liquid acid product phase and removed from the solid gypsum crystal phase, it has been found that a possible source of phosphate loss may occur from phosphate actually trapped in the outgoing gypsum crystals in a manner to resist washing therefrom by water. In accordance herewith, this loss is minimized when the gypsum crystals are formed as large and discrete rhombic crystals, rather than as small needle-shaped crystals (usually formed in quick precipitation under drastic cooling) clustered or adhering together in the filtering steps. The desired gypsum crystal form is encouraged or favored where crystallization occurs under conditions of low phosphoric acid concentration (about 20%–30%), high sulphuric acid concentration (about 5%–20%), and relatively moderate temperatures (about 140°–180° F.) with slurry recirculation to promote crystal growth. As will be apparent from the foregoing, these further conditions for optimum crystal production are also inconsistent with those above mentioned for obtaining conditions (a) and (b).

In accordance with this invention, however, these several inconsistent goals or conditions are satisfied generally by operating the initial acidulation reaction or digesting steps to maximize phosphoric acid concentration and notwithstanding the production of hemihydrate therein, instead of the desired dihydrate, and then separating the product acid from the precipitant or crystalline phase prior to a later stage treatment wherein the hemihydrate crystalline phase is recrystallized or converted to dihydrate crystals under circumstances where the desirable crystals form will be obtained and readily filtered. Thus, processes embodying and for practicing this invention may conveniently or illustratively be considered as having a first acidulation digesting and reacting stage in which hemihydrate is formed under circumstances where the concentration of sulphuric acid is maintained low enough to avoid the presence of substantial excess of free sulphuric acid and yet at operating temperatures and concentrations providing a desirably highly concentrated phosphoric acid while, subsequently, and after separating the product phosphoric acid therefrom, the undesired hemihydrate thus formed is treated in a gypsum-producing stage for recrystallization and precipitation under conditions where there is maintained control of temperatures and concentrations (particularly higher concentrations of sulphuric acid) to form the proper environment for calcium sulphate dihydrate crystal precipitation and separation as desired, but only after the principal phosphoric acid product has been separated from the slurry or crystal phase.

Stated otherwise, a variety of different processing environments is maintained at various stages of the instant process. In the initial reaction or hemihydrate stage the primary phosphoric acid product is produced in an environment most favorable to the high concentration and acid-free production thereof while also precipitating hemihydrate as an intermediate material which could not itself be advantageously treated subsequently without change. Thereafter, and subsequent-to removing the desired product acid from the hemihydrate crystalline phase, the latter is treated in a gypsum-producing stage in a quite different environment (i.e., high sulphuric acid concentration, low phosphoric acid concentration, and moderate temperature) particularly advantageous to the formation of the desired gypsum crystals but completely incompatible with the environment desired in the first acidulation stage.

Merely as illustrative of the advantages of operations in accordance herewith one may note satisfactory results in the production of phosphoric acid of concentrations as high as 42% to 45% directly as withdrawn from the process, yet having no discernible sulphuric acid as tested with standard barium chloride reagent, while total $P_2O_5$ losses as incorporated one way or the other in the gypsum crystal tailings were only about 1.45% of the total $P_2O_5$ in the phosphate rock (i.e., a total yield recovery of 98.55%). By contrast, as is well known, conventional processes achieve such results as producing phosphoric acid in the 30% to 35% concentration range of $P_2O_5$ but, if the sulphuric acid concentration in the product is reduced to around 2%, $P_2O_5$ losses in the gypsum tailings may run of the order of 5% or more of the available $P_2O_5$, and, on the other hand, if the $P_2O_5$ lost in the gypsum tailings is reduced to perhaps 2%, the phosphoric acid product may have free sulphuric acid contained therein running as high as 5.5% or more.

Furthermore, such enhanced results in accordance with this invention become more emphatic when one considers so-called "low grade" phosphate rock starting materials as those containing substantial proportions of iron or aluminum. Under conventional conditions or operation, the iron or aluminum phosphates inevitably formed in the acidulation step may be incorporated (as essentially insoluble) into the gypsum crystal tailings phase, especially if phosphoric acid concentrations of over 30% are produced, and, consequently, are separated from the phosphoric acid product, thus providing a loss of available phosphate, whereas, in operations in accordance herewith, the phosphoric acid product is removed at a point in the process where the concentration and temperature conditions are such that iron or aluminum phosphates are relatively soluble and, thus, removed along with other soluble phosphates to be part of the useful desired product, rather than be wasted with the solid phase tailings.

As is more comprehensively illustrating operations and arrangements embodying and for practicing this invention reference may be had to the accompanying flow sheet drawing depicting, merely for illustrative purposes, a phosphoric acid plant or sequence of steps and arrangement of apparatus in accordance herewith. Thus, merely for clarity, the flow sheet drawing is arranged in three sections as indicating the initial acidulation or reaction and hemihydrate production, the recrystallization and gypsum (dihydrate) production and, finally the filtering section for the gypsum crystalline by-product.

In the first section, primary and secondary digesters are indicated at 10 and 11, each having conventional agitators 12 and 13, and with a mixing tank 15 intermediate digesters 10 and 11, with conduits 16 and 17 leading to each. Vacuum cooling apparatus 20 is also provided, having an agitator 21 therein and an over flow pipe 22 for delivering material from cooler 20 to mixing tank 15, whence it flows to digesters 10 and 11 through conduits 16 and 17. Since conduit 16 is at a somewhat lower level than conduit 17 exiting from mixing tank 15, flow from vacuum cooler into mixing tank 15 is automatically proportioned with a larger portion thereof returning to digester 10 through conduit 16 and the other portion flowing into digester 11 through conduit 17.

Although described in more detail hereafter, the initial acidulation or digestion of phosphate rock starting material, entering digester 10 at 25, is accomplished in the hemihydrate section, comprising digesters 10 and 11 and the aforementioned apparatus in the illustrated embodiment, to form a slurry of calcium sulphate hemihydrate in concentrated phosphoric acid. This slurry is separated at a conventional vacuum filter mechanism 30 or other solid-liquid separating means (such as a centrifuge, cyclone, hydroseparator, etc., as described below), with the solution of product acid and soluble phosphates leaving the system through product outlet 31 and with the residue or filter cake from the hemihydrate filter or separator entering the second or gypsum-crystallization section as indicated by line 32.

This second section comprises recrystallizing tanks or digesters 35 and 36, each having an agitator 37 and 38, and with a mixing tank 39, having conduits 40 and 41 therein, as above described with regard to mixing tank 15. A gypsum slurry vacuum cooler 45 is also provided, with an agitator 46, and with an over flow leg 47 leading into mixing tank 39.

The filter cake or residue from filter or separator 30 is introduced into the gypsum crystal section and repulped or redissolved and recrystallized therein, preferably with intermediate cooling, etc., as described in more detail below, for the formation of the desired gypsum crystals in an environment of higher sulphuric acid concentration, lower phosphoric acid concentration, and different temperatures than in the first hemihydrate section in which the primary product acid is formed. Thereafter, the slurry of gypsum crystals is passed (as by pump 48 and conduit 49) to a conventional countercurrent washing gypsum crystal filter arrangement having sections indicated at 50–53 as a conventional tilting pan type of filter. Washing water for the filtering operation is provided through water inlet 60 to the last section 53, with the filtrate therefrom being collected in filtrate tank 61 and pumped, by pump 62 and line 63, to wash the filter cake on filter section 52, the filtrate from which is collected in filtrate tank 64 and returned by pump 65 and line 66, to wash the filter cake on section 51—and so on, in known manner with countercurrent filter washing.

The filtrate from filter section 51 is collected in tank 67 and recycled, through pump 68 and line 69, into the inlet 70 of gypsum slurry vacuum cooler 45, while slurry from recrystallizing tank 35 enters the vacuum cooler through line 71 under the action of pump 72. Also the filtrate from the first filter section 50 is collected in filtrate tank 75 and recirculated, through line 76 by pump 77, into the inlet 78 of hemihydrate vacuum cooler 20, while slurry from primary digester 10 enters vacuum cooler 20 through line 79 under the action of pump 80. The sulphuric acid reactant is supplied from a source thereof variously indicated at 85 into hemihydrate cooler 20, through line 86 and inlet 78, and into gypsum vacuum cooler 45, through line 87 and inlet 70, in the appropriate proportions for controlling the acid component of the hemihydrate and gypsum crystallization sections of the arrangement in accordance herewith and as indicated in more detail below.

As further illustrative of operations and conditions embodying and for practicing this invention, phosphate rock, ground to a suitable fineness, is fed into primary digester 10 through inlet 25, where it is thoroughly dispersed in a slurry of calcium sulphate hemihydrate, phosphoric acid, and monocalcium phosphate. That is, sulphuric acid from 85 is introduced through 86 into vacuum cooler 20, where it is admixed with weak phosphoric acid (perhaps 20%–30% $P_2O_5$) from the filtrate of the first filter 50, and with a substantial volume of the dispersed slurry from primary digester 10. Preferably, this vacuum cooler 20 is constructed and operated generally in accordance with the disclosure of co-pending application Ser. No. 99,527, filed Mar. 30, 1961.

In accordance with such disclosure, vacuum cooler 20 is a large vessel having a capacity sufficiently larger than the throughput of volume of liquid so as to permit a residence time of about 3–15 minutes, and with agitator 21 having a circulating capacity within vacuum cooler 20 also many times the throughput circulation rate. In this manner, diluent from filter 50 enters cooler 20 through line 76 along with a substantial portion of hot slurry from digester 10, while a controlled proportion of sulphuric acid enters the cooler through line 86 (also producing additional heat of dilution) for holding and violent and constant agitation and circulation therein. A vacuum is produced above the liquid level in cooler 20 (as indicated at 88) so that substantial flash evaporation of water occurs at the liquid surface within cooler 20, producing a concomitant amount of cooling of the liquid at the surface. With 5–6 feet of liquid depth and 5–6 feet of vacuum space above the liquid, cooling and reaction are achieved with substantially no $P_2O_5$ losses through the vacuum system 88.

If all of this heat of dilution and reaction were instantaneously flashed off, as with conventional vacuum coolers, a drastic lowering of temperature would induce preliminary precipitation of sulphate, with scaling of the cooler walls, etc. With the particular type of apparatus and operation disclosed in the aforesaid co-pending application, however, the large quantity of admixed liquids is constantly circulated and recirculated through the cooler so that each increment of liquid is only briefly presented to the top liquid surface therein for flash evaporation thereat. In this manner and notwithstanding a substantial temperature drop during the entire time that any given bit of liquid is held within cooler 20, the actual temperature drop for each tiny increment of liquid presented to the evaporating surface is only a few degrees, with each such bit of liquid being presented again and again for further minor cooling until the entire temperature drop is achieved, before the cooled liquid overflows into overflow leg 22 to be returned to mixing tank 15, a portion of which will be recirculated to primary digester 10 through conduit 16, while the greater portion of the cooled hemihydrate slurry will be fed to secondary digester 11 through conduit 17.

As will be understood from the foregoing, the concentration of $P_2O_5$ and sulphuric acid and the temperature in the primary digestion section consisting of digesters 10 and 11 and vacuum cooler 20 are controlled so that hemihydrate and not gypsum is preferentially formed in this section. With the digester 10 operating at temperatures within the range of about 90° to 110° C., the $P_2O_5$ concentration is satisfactorily maintained within a range of about 36% to 45%, with the sulphuric acid concentration in digester 11 being maintained in a range which produces from about −1% to +1% free sulphuric acid (measured in terms of available $SO_4$ ions in solution which can be precipitated with standard barium chloride reagent to produce barium sulphate), with a negative concentration of sulphuric acid indicating monocalcium phosphate in the solution as may be desired. Such temperature and concentration conditions are controlled, as will be understood, by the quantity of filtrate from the first filter 50 introduced into vacuum cooler 20, the quantity of sulphuric acid introduced thereinto, and the proportion of slurry from digester 10 which is recirculated through the cooler and from mixing tank 15.

Thus, the filtrate from filter 50 may have a $P_2O_5$ concentration of within the range of about 20% to 30% and a free sulphuric acid concentration of from 5% to 15%. Also, it may not be considered practical to attempt filtering hemihydrate crystals from solutions as hot as the 90° to 110° C. temperatures prevailing in primary digester 10, it being preferred to have the solution in secondary digester 11 within the range of 65° to 80° C. prior to filtering at hemihydrate filter 30. By the foregoing arrangement of apparatus, the preferred adjustment of concentration in digester 10 and of temperature in digester 11 is readily achieved merely by the proportioning of flow of the materials into and from vacuum cooler 20, and the recirculation thereof within cooler 20 and back to digester 10, etc., to control the concentrations and the temperatures as desired and, also, to obtain a desired intimacy or admixture of phosphate rock with slurry and acid in vacuum cooler 20 before introducing it to primary digester 10.

Thus, the phosphate rock is originally introduced into digester 10, where the temperature is maintained as desired and where a deficiency of sulphuric acid is maintained. Generally the newly entering phosphate rock is dissolved and dispersed adequately in the slurry in digester 10 prior to circulating a portion thereof through vacuum cooler 20 for admixture with sulphuric acid as diluted by filtrate from the first section 50 of the filter 50–53. In order to avoid effects of localized high concentration of sulphuric acid in the reacting slurry, it may be preferred to introduce sulphuric acid into cooler 20 as by spraying it only on the upper surface of liquid therein, as indicated in the drawing, with, perhaps, the provision of the baffle immediately adjacent overflow outlet into leg 22.

The concentrations and temperatures in digester 10 are further controlled by recirculating cooled slurry thereto from mixing tank 15, while the preponderant proportion of cooled and reacted slurry is introduced into secondary digester 11 for further holding and reaction and agitation therein prior to being pumped to hemihydrate filter 30 through line 90 and pump 91. Whereas a slight deficiency of sulphuric acid may be desired in digester 10 (for avoiding coating particles of rock with calcium sulphate) complete precipitation of the calcium hemihydrate (from the monocalcium phosphate) is desired in digester 11 and, accordingly, any deficiency of sulphuric acid is corrected or made up in digester 11 (through sulphuric acid inlet means not shown) for complete reaction but while avoiding a substantial excess of free sulphuric acid (e.g., no more than 0.5%).

That is, as noted above, substantial concentrations of sulphuric acid in the primary digester may coat entering phosphate particles with a gypsum coating which insulates the remainder of the particle from acid reaction, thus, increasing phosphate losses as a part of the solid phase tailings ultimately removed. When digester 10 is operated with a deficiency of sulphuric acid, the mother liquor in the digester into which new phosphate rock is introduced is primarily made up of phosphoric acid with some monocalcium phosphate. The phosphate rock then goes into solution in this mother liquor producing additional monocalcium phosphate in accordance with the reaction:

$$Ca_3(PO_4)_2 + 4H_3PO_4 \rightarrow 3Ca(H_2PO_4)_2$$

Substantially no calcium sulphate is thus formed during this initial solution of the entering raw material phosphate rock. After substantially complete solution or dispersion is obtained (under the action of agitator 12 in primary digester 10), and after cooling and other concentration adjustments are made through recirculation and otherwise as explained above, any necessary restoration of the sulphuric acid balance is adjusted in secondary digester 11 (through the addition of more sulphuric acid if necessary) to produce a substantially complete precipitation of calcium sulphate hemihydrate and phosphoric acid, as follows:

$$3Ca(H_2PO_4)_2 + 3H_2SO_4 + 1.5H_2O \rightarrow 3CaSO_4 \cdot 1/2H_2O + 6H_3PO_4$$

Thus, the so-called citrate insoluble losses, conventionally caused by unreacted phosphate rock, are eliminated or minimized in accordance herewith, even when the originally entering rock raw material has not been extremely finely ground prior to its introduction into the process. This may be considered as a substantial commercial advantage of processes embodying this invention because it permits utilization of certain commercial phosphate ores, constituted almost entirely of flotation concentrates with a maximum coarseness of about 28 mesh, without prior grinding and with negligible decrease in $P_2O_5$ yield, as compared with conventional processes where a raw material of this type might be expected to result in a reduction of $P_2O_5$ yield of several percentage points in the absence of special preliminary grinding or treatment.

In any event, the cooled and reacted slurry from secondary digester 11 is introduced through line 90 and pump 91 to hemihydrate filter 30, which is satisfactorily a simple filter construction or other solid-liquid separating apparatus (such as a centrifuge, etc.) where a strong solution of product phosphoric acid is withdrawn as the final product at 31, while a solid hemihydrate filter cake is removed and introduced into the recrystallization and gypsum section of the process as indicated by line 32. The product acid removed will be substantially equal to the total volume of acid produced, and contains virtually no free sulphuric acid or dissolved calcium phosphate. As noted below, in the operation particularly with low-grade rock starting materials, the product acid removed at 31 also contains substantially all of the iron or aluminum phosphates which might be insoluble and wasted if removed under other acid concentrations with the final gypsum crystalline phase. Satisfactory results have been achieved in accordance herewith in achieving a concentrated phosphoric acid product at 31 having a $P_2O_5$ concentration of about 36% to 45% or higher, depending upon the analysis of the original phosphate rock, and as contrasted with maximum acid concentrations of around 30% to 32% from conventional acidulation processes.

The unwashed filter cake from hemihydrate separator 30 (consisting of calcium sulphate hemihydrate wetted with or containing a substantial amount of strong phosphoric acid product) is discharged directly into recrystallizing tank 35, equipped with agitator 37 and having a sufficient capacity to provide several hours retention time, where the hemihydrate crystals are repulped or redissolved into a slurry of phosphoric and sulphuric acids having respective concentrations within the range of about 20%–30% $P_2O_5$ and 5%–20% sulphuric acid and under conditions tending to favor recrystallization and formation of large rhombic gypsum crystals of calcium sulphate dihydrate. At temperatures within the range of about 72°–85° C., the hemihydrate product from separator 30 is readily dissolved and recrystallized as the dihydrate, with the acid concentration in recrystallizer 35 being particularly selected and controlled to provide an environment favoring the desired gypsum crystal formation as large uniform rhombic shapes (which are readily filtered) and substantially free of occluded or co-crystallized impurities, particularly dicalcium phosphate.

As noted above, it is desired to increase the sulphuric acid concentration in the gypsum crystallizing section of the process, but it has been found that high local concentrations of sulphuric acid, prior to being uniformly dispersed in the slurry, tend to dehydrate and disrupt the desirably large gypsum crystals being formed in the vicinity of acid introduction, thus impairing the filterability of the crystals formed. Accordingly, additional sulphuric acid is preferably introduced into this gypsum crystallization stage (in much the same manner as it was introduced into the primary digestion stages) by sprayed admixture in vacuum cooler 45 with a large and rapidly circulating volume of diluents formed by the filtrate from the second gypsum filter section 51 (introduced from filtrate tank 67 through line 69) and a recirculated portion of the recrystallizing slurry from tank 35 introduced into vacuum cooler 45 through line 71.

Not only does the utilization of vacuum cooler 45 as a location for dilution admixture of sulphuric acid avoid local concentrations disruptive of good crystal formation, but it also provides a preliminary source of fine gypsum seed crystals for subsequent return to tank 35 (through overflow leg 47 from vacuum cooler 45 and mixing tank 39 as described before) for enhanced gypsum crystal formation, while the bulk of cooled and recrystallizing slurry from vacuum cooler 45 is introduced for ultimate and slow formation onf large rhombic gypsum crystals as calcium sulphate dihydrate in crystallization tank 36, and at temperatures of approximately 60° C. as those most favorable to slow gypsum crystal formation. In addition to recrystallizing the hemihydrate in tanks 35 and 36, any undissolved phosphate rock which may have escaped reaction in digesters 10 and 11 will be subject to further attack by sulphuric acid for complete solution and reaction within the process to form soluble phosphates which eventually will be recirculated back to evolve at the acid product outlet 31 because of recirculation of all liquid components and filtrates from the crystallization and filtering stages back to the original digesting stage. Any substantial heat release due to recrystallization of gypsum from the hemihydrate in the recrystallization tank 35 is adequately removed in vacuum cooler 45, as explained above with regard to vacuum cooler 20, not only by vacuum cooling but also by the dilution and admixture of filtrate from filter section 51, and without having such heat removal or high acid concentrations disrupting existing gypsum crystals.

As previously noted, the resulting slurry of gypsum crystals is subjected to the filtering stages noted on the conventional filter 51–53, with countercurrent circulation of wash water and filtrate, to leave the final gypsum product washed and completed as emerging from final filter section 53 for handling in well known and conventional manner as may be desired.

Also, as previously noted, operations and arrangements in accordance herewith permit a production of high concentrated phosphoric acid (over 40% or more $P_2O_5$) with high $P_2O_5$ recovery yields, even when using low-grade phosphate rock containing significant amounts of iron and aluminum. That is, in conventional phosphoric acid process in which the final solid or crystalline phase by-product is actually crystallized in the product acid mother liquor, with countercurrent filtration washing for the ultimate separation thereof, there is imposed the limitation on the strength of phosphoric acid which can be produced (without evaporation and without high $P_2O_5$ losses) from so-called low-grade phosphate rock containing relatively high iron and aluminum components.

Thus, the iron and aluminum in the original rock feed are converted to iron and aluminum phosphates in the acidulation and digestion steps and have but limited solubilities in phosphoric acid solutions, which if substantially exceeded may precipitate along with the calcium sulphate slurry. In conventional processes, iron and aluminum phosphates are separated along with the soluble phosphate phase, thus wasting a portion of the originally available phosphate materials along with the gypsum crystals—at least unless the phosphoric acid mother liquor is deliberately limited in concentration to no more than about 30% $P_2O_5$ when employing phosphate rock starting material containing more than about 3% or so of iron or aluminum oxides. In such systems, then, if stronger than 30% $P_2O_5$ phosphoric acid is desired for subsequent utilization, the product acids solution phase must somehow or other be concentrated after withdrawal from the system, as by water evaporation or some other extra operation which may be quite expensive and/or troublesome from the standpoint of corrosion or scale-forminng problems generally incident to evaporating techniques on wet process phosphoric acid.

According to this invention, by contrast, a highly concentrated phosphoric acid product (over 40% $P_2O_5$ as noted above) is satisfactorily produced directly, even when employing as the feed material a phosphate rock having substantial portions of iron and/or aluminum therein, and without substantial reduction of $P_2O_5$ yield, particularly because of the completely different acid and other concentration environments deliberately produced in the hemihydrate and gypsum crystallization sections in accordance herewith. With such operations using such low-grade rocks, it is preferred to substitute for hemihydrate filter 30 a continuous centrifuge (such as a well-known bowl-type centrifuge) or a hydroseparator or cyclone separator of other type of equipment for classifying particles of different sizes or specific gravities suspended in the liquid. It has been found that the iron or aluminum phosphates formed in the primary digestion steps are relatively much finer particles (practically colloidal in size) than the hemihydrate crystals formed. Thus, by using a classification device such as a centrifuge instead of a vacuum filter, such iron or aluminum phosphate particles can be separated in suspension in the mother liquor from the coarser hemihydrate crystals, with the finer particles passing out the product acid take off 31 with the soluble phosphates, while the coarser hemihydrate crystals are directed into the gypsum crystallization stage from whatever centrifugal or cyclone or hydroseparator device may be utilized at 30 instead of the filter indicated in the drawing. Even though the iron and aluminum phosphate particles are relatively fine, they still may become readily entrapped with the hemihydrate crystals in a filtering operation.

In the gypsum crystallization stage, the concentration of phosphoric acid is much lower (20% to 30% $P_2O_5$ as noted above) so that any iron or aluminum phosphate material escaping separation in separator 30 and carried into the gypsum crystallization stage will remain dissolved in the lower concentration phosphoric acid there, and will be eventually recycled into the product acid take-off 31 as part of the soluble phosphates, instead of being separated in the gypsum stage along with the gypsum tailings. Thus, operations in accordance herewith, even with low-grade rock, enable a much higher concentration of phosphate in the solution product than is otherwise obtainable, while also minimizing tremendously $P_2O_5$ losses usually occuring if the iron or aluminum phosphate are separated along with the crystalline product and wasted with such tailings. It may be, of course, that such iron or aluminum phosphates will eventually precipitate out of the phosphoric acid product in storage and, for some purposes or uses of the product, may have to be separately treated there, but the utility of such phosphates in fertilizer manufacture and other uses to which the phosphoric acid product may be put is well understood and the recovery thereof from low-grade rock in accordance herewith definitely enhances the overall yield of phosphate recovry, as well as the concentration of product acid as compared with conventional process in which the crystalline fraction is ultimately separated directly from the desired product mother liquor.

Similarly, as a modification of the system described above, the utilization of a classifier or centrifuge type of apparatus, in place of a vacuum filter for hemihydrate separation at 30, enables some further simplification of the flow sheet arrangement described above. Since it is primarily control of acid concentration, rather than temperature, in the hemihydrate precipitation or primary digestion stage in accordance herewith which is relied on to achieve results here, the entire first section of the arrangement is satisfactorily operated at relatively higher temperatures than those indicated heretofore, except as the demands of vacuum filtration impose a limitation. Thus, the desired precipitation of hemihydrate instead of dihydrate is satisfactorily controlled at quite high temperatures (or, even, independently of temperature control), whereas it is primarily the step of vacuum filtering at hemihydrate filter 30 which suggests a cooling step between digesters 10 and 11, since, as is well known, vacuum filtration requires cooling the slurry below the flash point of the liquid for satisfactory operation.

A centrifuge or cyclone separator or hydroseparator, as will be understood, operates satisfactorily at relatively high temperatures (or even independently of temperature, assuming the boiling point of the liquid is not exceeded). Accordingly, should it be preferred in accordance herewith, the entire hemihydrate vacuum cooler apparatus 20 may be eliminated, providing a mechanical or centrifugal classifier is employed instead of filter 30, for separating the hemihydrate crystalline phase from the acid product solution.

Thus, even though heat of reaction and dilution of the sulphuric acid may raise the temperature of the slurry in the primary digester even up to the boiling point (which may be approximately 230° F. regarding the materials involved), the digesters 10 and 11 (or, perhaps, only one digester 10) are formed as closed tanks to be operated at the boiling point of slurry, and with conventional steam condensing means (not shown) associated therewith. The condensate from such condensor contains, as will be understood, the various obnoxious fluorine compounds (such as silicon tetraflouride) routinely formed in such acidulation processes, and such compounds are readily scrubbed from the condenser effluent (with fluorine recovery in conventional manner if desired) before exhausting the fumes to the atmosphre. As will be understood, from the foregoing, similar condenser and scrubbing or fluoride recovery steps are associated, as conventional with the vacuum coolers 20 and 45 in the vacuum exhaust lines 88 and 92 thereof, all in known manner.

As will be apparent from the foregoing, then, there is provided in accordance herewith methods of operation and arrangements of apparatus for producing wet process phosphoric acid (and a higher grade gypsum by-product) of higher concentrations and with better total phosphate yield recovery than with conventional processes, even when low-grade phosphate rock starting materials are used. The particular pieces of apparatus involved are no more complex than (indeed, generally the same as) in conventional processes, yet enhanced results are obtained. Furthermore, because of creating two completely different environments in the first digestion or hemihydrate precipitation section as compared with that in the second or gypsum crystallization section, operations in accordance herewith are substantially freed of the narrow operational limitations of temperature and concentration control required in conventional processes in which the final gypsum product is attempted to be separated as such from the phosphate or acid product mother liquor. In any event, because of deliberately different environments in the two stages of operation here, whatever controls are required for optimal operation of the first stage do not affect or upset the different conditions maintained in the second section.

Thus, control of sulphuric acid concentration in the primary digestion stages (to maintain a deficiency in digester 10 and a relatively precise balance in digester 11) is readily accomplished without adversely affecting the gypsum precipitation, in which entirely different concentration conditions are maintained, and, by controlling the operation of the first section primarily from the standpoint of sulphuric acid concentration, operation thereof is achieved more or less independently of the conventionally necessary close control of temperature and $P_2O_5$ concentrations therein. Similarly, since the soluble phosphate product is removed or separated from the crystalline phase prior to the gypsum crystallization steps, these latter are readily controlled, from the standpoint of higher sulphuric acid concentration, lower phosphoric acid concentration, and such temperature controls as will favor or promote the type of gypsum crystal formation desired, etc.—all of which are independent of the highly inconsistent conditions favoring maximum phosphate recovery and acid product concentration in the primary digestion or acidulation steps.

Similarly, as noted above, satisfactory results have been achieved in accordance herewith producing substantially stronger phosphoric acid products (perhaps 45% $P_2O_5$ as compared with 32% for conventional processes), with the product containing a minimum of dissolved calcium or free sulphuric acid (which may run about 0.1% sulphuric acid as compared with perhaps 2.0% for conventional process or even as much as 4% and 5% for some "high recovery" processes). Also, operations in accordance herewith avoid the difficulty of washing an unstable hemihydrate crystal and/or the scaling problems associated therewith, and, since the final crystals to be washed are gypsum dihydrate formed specifically in an environment favoring the slow production of large easily filtered rhombic crystals, the total quantity of wash water which must be added to the systems (and, of course, forms a diluent for the final acid product thereof) is substantially less.

By recrystallizing substantially all of the calcium sulphate materials initially precipitated or formed by the primary acidulation or digestion, and by performing such recrystallization in an optimumly controlled mother liquor, less phosphate is co-crystallized with the gypsum tailings, and phosphate losses are substantially minimized as compared with conventional processes. By the same token, as will be understood, the quality of gypsum produced is itself enhanced and, although considered primarily a by-product of the production of phosphoric acid, has been found to command a higher price for such gypsum uses as plasterboard, etc., where the quality and purity of the gypsum itself becomes commercially significant.

While the methods and forms of apparatus herein disclosed form preferred embodiments of this invention, this invention is not limited to these precise methods and forms of apparatus, and changes may be made therein without departing from the scope of this invention which is defined in the appended claims.

What is claimed is:

1. In a two-stage process for the production of phosphoric acid and gypsum wherein calcium phosphate rock is reacted with a first liquid containing phosphoric and sulfuric acids under conditions conducive to crystallization of calcium sulfate hemihydrate thereby forming additional phosphoric acid and crystals of hemihydrate, said crystals of hemihydrate and acid mother liquor are separated, the latter being withdrawn as phosphoric acid product, and said crystals of hemihydrate are dissolved and recrystallized in a second liquid containing phosphoric acid under conditions conducive to crystallization of gypsum, said gypsum thus formed being then separated from mother liquor and washed, the improvement which comprises: forming said second liquid for recrystallization of hemihydrate by combining at least a portion of the wash liquor from said gypsum crystal wash with sulfuric acid in quantity sufficient to maintain an excess of free sulfuric acid in the said gypsum crystallization; and forming said first liquid for reaction with phosphate rock by combining at least a portion of the mother liquor from said gypsum crystallization with supplementary sulfuric acid in an amount such that the total sulfuric acid in said reaction is approximately the stoichiometric amount required for reaction with calcium in said rock, thereby continuously producing with minimum loss of phosphate value a highly concentrated phosphoric acid of low sulfate content and pure gypsum.

2. The process of claim 1 wherein the recrystallization of hemihydrate is carried out in the presence of 5 to 20% by weight free sulfuric acid, the mother liquor formed in said recrystallization containing 20% to 30% by weight $P_2O_5$.

3. The process of claim 2 wherein the total amount of sulfuric acid in said reaction of phosphate rock and first liquid is from —1% to +1% of the stoichiometric amount required for reaction with calcium, the mother liquor therein formed containing from 35 to 47% by weight phosphoric acid.

4. The process of claim 3 wherein the reaction of said phosphate rock with said first liquid is conducted at a temperature between 80° C. and the boiling point of the calcium sulfate hemihydrate slurry formed, and the hemihydrate recrystallization to gypsum is conducted at a temperature between 60° C. and 85° C.

5. The process of claim 1 wherein said gypsum formed by recrystallization of hemihydrate is filtered from its mother liquor, at least a portion of the said mother liquor passing to said reaction of phosphate rock, and then washed with water in a plurality of countercurrent washing-filtering stages, at least a portion of the wash liquor from said wash-filter passing to said hemihydrate recrystallization.

6. In a two-stage process for the production of phosphoric acid and gypsum wherein calcium phosphate rock is reacted with a first liquid containing phosphoric and sulfuric acids at a temperature above 80° C. and below the boiling point of the system thereby forming additional phosphoric acid and crystals of calcium sulfate hemihydrate, said crystals of hemihydrate and acid mother liquor are separated, the latter being withdrawn as phosphoric acid product, and said crystals of hemihydrate are dissolved and recrystallized in a second liquid containing phosphoric acid at a temperature between 60° and 85° C. thereby forming crystals of gypsum, the said crystals thus formed being then separated from mother liquor and washed, the improvement which comprises: forming said second liquid for recrystallization of hemihydrate by combining at least a portion of the wash liquor from said gypsum crystal wash with sulfuric acid in quantity sufficient to maintain an excess of 5 to 25% by weight free sulfuric acid in the said gypsum crystallization; and forming said first liquid for reaction with phosphate rock by combining at least a portion of the mother liquor from said gypsum crystallization, said mother liquor containing 20 to 30% by weight $P_2O_5$, with supplementary sulfuric acid in an amount such that the total sulfuric acid in said reaction is from —1% to +1% of the stoichiometric amount required for reaction with calcium in said rock, thereby continuously producing with minimum loss of phosphate value a concentrated phosphoric acid containing 35 to 47% by weight $P_2O_5$ having low sulfate content and pure crystals of gypsum.

References Cited

UNITED STATES PATENTS

| | | | |
|---|---|---|---|
| 1,836,672 | 12/1931 | Larsson | 23—165 |
| 1,916,431 | 7/1933 | Larsson | 23—165 |
| 2,531,977 | 11/1950 | Hammaren et al. | 23—122 |
| 2,885,264 | 5/1959 | Peet | 23—165 |

FOREIGN PATENTS 373,701  6/1962  Japan.

OTHER REFERENCES

Waggaman: Phosphoric Acid, Phosphates & Fertilizers, 2nd Edit. (1950); pp. 184 and 185 relied on.

HERBERT T. CARTER, Primary Examiner

U.S. Cl. X.R.

23—165